(No Model.)

H. NICHOLSON.
MILK COOLER.

No. 469,407.  Patented Feb. 23, 1892.

WITNESSES:
L. Douvilles
Wm. C. Wiederskeim

INVENTOR
Henry Nicholson
BY
John A. Wiederskeim
ATTORNEY.

UNITED STATES PATENT OFFICE.

HENRY NICHOLSON, OF GIBBSBOROUGH, NEW JERSEY.

MILK-COOLER.

SPECIFICATION forming part of Letters Patent No. 469,407, dated February 23, 1892.

Application filed July 24, 1891. Serial No. 400,536. (No model.)

*To all whom it may concern:*

Be it known that I, HENRY NICHOLSON, a citizen of the United States, residing at Gibbsborough, in the county of Camden and State of New Jersey, have invented a new and useful Improvement in Milk-Coolers, which improvement is fully set forth in the following specification and accompanying drawings.

My invention relates to improvements in milk-coolers; and it consists of a can or vessel adapted to contain ice or other cooling material, and having vertically-corrugated neck, and having horizontally-corrugated walls over which the milk to be cooled is caused to flow, and a surrounding trough.

It further consists of a pan or basin, as hereinafter described, adapted to be seated on the said cooling-pan and provided with perforations to direct the milk therefrom over the corrugated vessel.

It further consists of the combination of parts, as hereinafter set forth.

Figure 1:
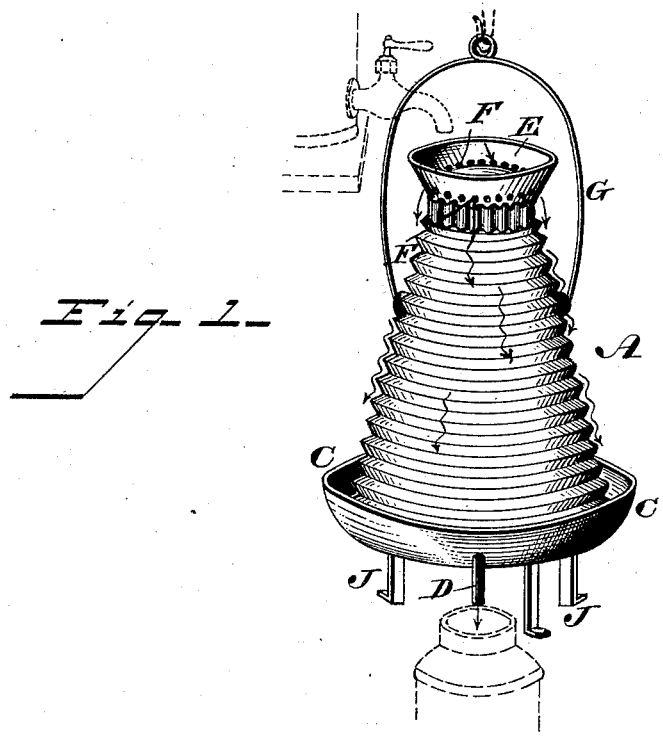
Figure 2:
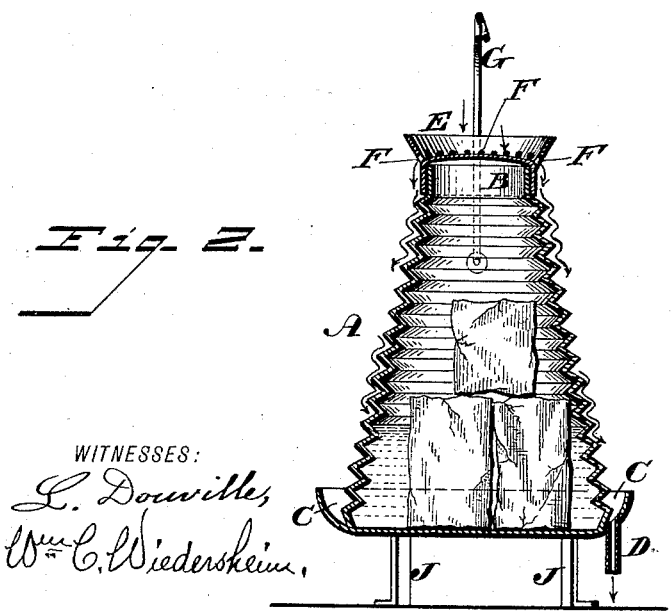

Figure 1 represents a perspective view of a milk-cooler embodying my invention. Fig. 2 represents a central vertical section thereof.

Similar letters of reference indicate corresponding parts in the two figures.

Referring to the drawings, A designates a cooling can or vessel, preferably of conical form, with horizontal corrugations thereon and provided with a neck B, having vertical corrugations. To the lower end or bottom of the can A and surrounding the same is connected a trough C, having an outlet-pipe D. Seated on the said can is a pan E, which serves as a closing-cap for the said can, and has the perforations F at or near the bottom thereof and on the outside of the neck for the escape of the milk therefrom.

A bail or handle G is secured to the sides of the can for convenience in handling the same and also for suspending it, if so desired. The can is also provided with feet J for supporting purposes.

In using the device the can A is filled with ice and water or other cooling material and the pan E placed thereon. The milk or other liquid to be cooled is poured into the said pan E and as it escapes therefrom through the perforations F it is separated into numerous small currents by the corrugated neck B, down which it flows. As it comes in contact with the horizontal corrugations on the vessel, the currents are broken, so that the milk becomes aerated and at the same time cooled. On reaching the lower end of the can the milk is received into the trough C, from which it is discharged by the outlet-pipe D into a can or other suitable receptacle. It will be seen that by having a vertically-corrugated surface to receive the milk as it escapes from the pan E it is separated into numerous currents, so that it does not fall upon the sides of the can in a compact mass, but is broken up before reaching the same, thereby permitting aeration and greatly assisting in the cooling thereof. The inclined sides of the vessel present a much larger surface and insure a spreading out of the currents, and the corrugations thereon cause the said currents to be constantly divided or broken, so that the milk is sprayed before it reaches the trough C, thus causing the smallest particles to come in contact with the cooling-surface, whereby the temperature of the milk is more readily reduced to that of the said cooling-surface.

Having thus described my invention, what I claim as new, and desire to secure by Letters Patent, is—

1. A cooling-vessel having a conical body with a vertical neck thereon, a pan on said neck having perforations therein outside of the neck, and a trough surrounding the base of the said body, said neck having vertical corrugations, and said body having horizontal corrugations, said parts being combined substantially as described.

2. A milk-cooler consisting of a conical vessel with a cylindrical neck, horizontal corrugations on said vessel and vertical corrugations on said neck, a pan with perforations forming a cap on said neck, and a trough surrounding said vessel, said parts being combined substantially as described.

HENRY NICHOLSON.

Witnesses:
JOHN A. WIEDERSHEIM,
A. P. JENNINGS.